Feb. 24, 1942.  C. S. CODY  2,274,338

FLUID-TRANSLATING APPARATUS

Filed Jan. 18, 1941  2 Sheets-Sheet 1

INVENTOR
CLIFFORD S. CODY
BY
ATTORNEY

WITNESSES:

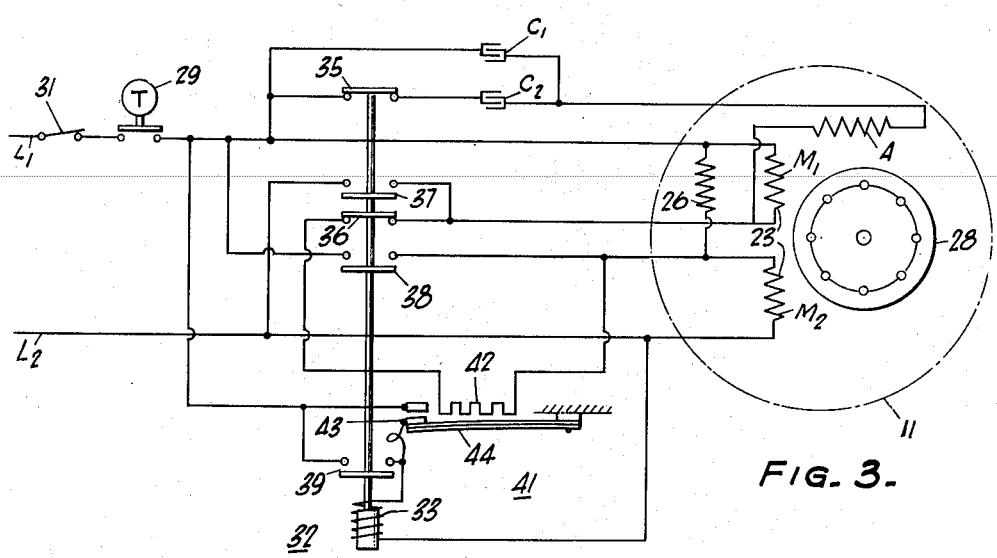
FIG. 3.
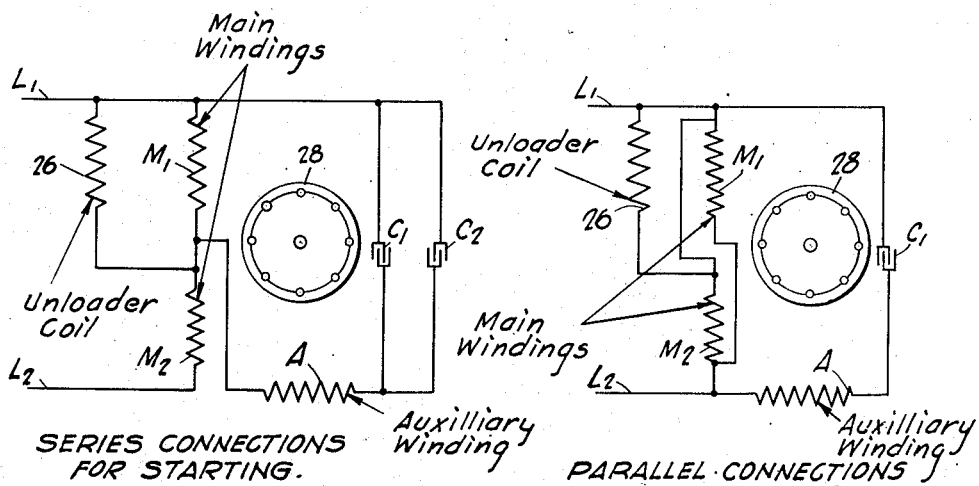
SERIES CONNECTIONS FOR STARTING.
FIG. 4.
PARALLEL CONNECTIONS FOR RUNNING.
FIG. 5.
WITNESSES:
INVENTOR
CLIFFORD S. CODY
BY
ATTORNEY Patented Feb. 24, 1942

2,274,338

UNITED STATES PATENT OFFICE 2,274,338

FLUID-TRANSLATING APPARATUS

Clifford S. Cody, Springfield, Mass., assignor to Westinghouse Electric & Manufacturing Company, East Pittsburgh, Pa., a corporation of Pennsylvania Application January 18, 1941, Serial No. 374,973

7 Claims. (Cl. 230—24)

My invention relates to fluid-translating apparatus, more particularly to a motor-compressor unit having mechanism for unloading the compressor during starting, and it has for an object to provide an improved control for the unloader mechanism.

A further object is to provide an unloader control that affords effective unloading.

A further object is to provide, for a motor-compressor unit enclosed in a fluid-tight casing, an unloader control that does not require an additional lead through the fluid-tight casing.

The preferred embodiment of my invention comprises a single phase induction motor having two main windings which are connected in series for starting and in parallel for running. An electrically-energized unloader is connected in such manner that it is in parallel with one of the main windings during starting and is thereby energized, and has both terminals connected to the same line conductor during running, whereby it is deenergized.

These and other objects are effected by my invention as will be apparent from the following description and claims taken in connection with the accompanying drawings, forming a part of this application, in which:

Fig. 3 is a diagrammatic view of the control for the motor and the unloader; and Figs. 4 and 5 are diagrammatic views showing how the motor windings and the unloader coil are connected during the starting and running periods, respectively.

Figure 1:
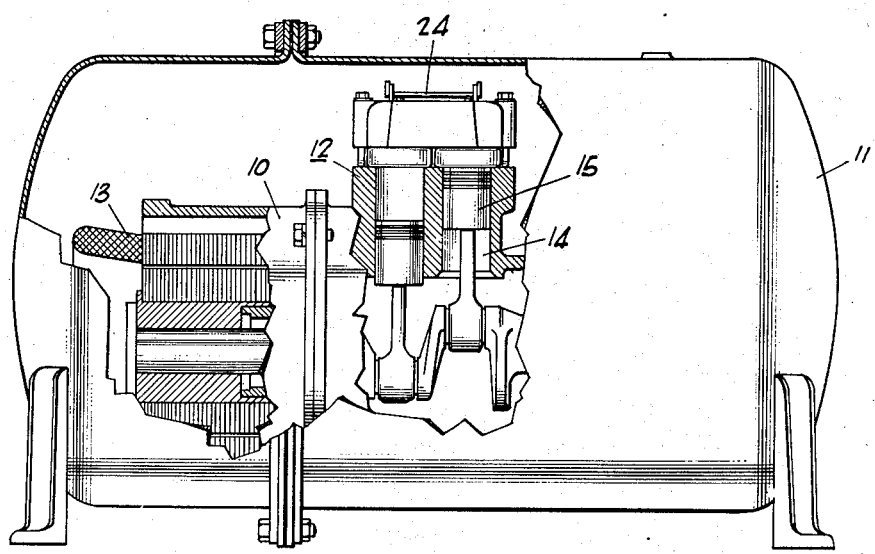
Fig. 1 is a side elevation, with parts in section, of an enclosed motor-compressor unit having an unloader and a control therefor in accordance with my invention.

Referring to the drawings in detail, I show a motor-compressor unit 10 which is enclosed in a fluid-tight casing 11 and which is, therefore, suitable for use in a refrigerating system, although it is not so limited. The unit comprises a compressor 12 and a motor 13 directly connected to the compressor and driving the same. The compressor 12 may be of a suitable reciprocating type, comprising cylinders 14 and pistons 15 operating in the cylinders.

Figure 2:
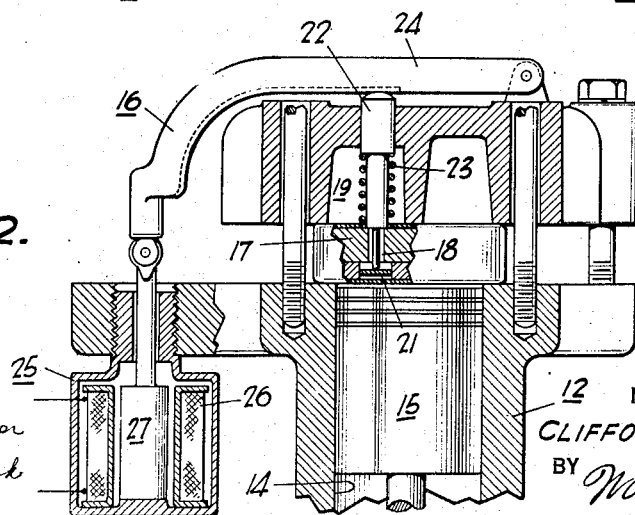
Fig. 2 is a sectional view through one of the compressor cylinders and an electrically-energized unloader therefor.

A suitable type of unloader is provided to remove the load from the compressor during the starting period so as to permit the use of a low starting current motor. So far as the present invention is concerned, the unloader may be of any suitable type, and in Fig. 2, I show an unloader 16 which is of the type that holds the suction valve in open position. Referring to Fig. 2, the cylinder 14 is provided with a suction valve comprising a plate 17 having a slot or suction port 18 therein through which refrigerant vapor may flow from the suction chamber 19 to the cylinder 14. A valve reed or strip 21 is adapted to seat against the lower surface of the plate 17 to close the port 18 on the compression stroke of the piston 15. The unloader includes a plunger 22 which extends down through the port 18 and which is adapted to engage the valve reed 21 to hold the same in open position. The plunger 22 is biased upwardly by a spring 23 into engagement with a lever 24. The latter is actuated by a solenoid 25 comprising a solenoid coil 26 held in stationary position and a solenoid core 27 connected to the lever 24. The arrangement is such that when the coil 26 is energized, the plunger 22 is moved downwardly by means of the core 27 and the lever 24 to hold the valve reed 21 in open position. When the coil 26 is deenergized, the spring 23 raises the plunger 22 to permit the valve reed 21 to move to closed position during the compression stroke. Preferably, both cylinders are provided with plungers 22 and the lever 24 is of Y or fork shape to engage both plungers.

The motor 13 is a single phase induction motor. It comprises a primary or stationary member provided with two main windings $M_1$ and $M_2$ and with an auxiliary or capacitor winding A. (See Fig. 3.) The motor further includes a squirrel cage rotor 28. Electrically-connected to the auxiliary winding A are two capacitors $C_1$ and $C_2$, one or both of which may be included in the auxiliary winding circuit. Line conductors $L_1$ and $L_2$ provide single phase alternating current of 110 volts, for example, for energizing the motor 13 and the unloader coil 26.

During the starting period, the main winding $M_1$ and $M_2$ are connected in series between the line conductors $L_1$ and $L_2$ as shown in Fig. 4. This arrangement provides low current consumption, only 55 volts being imposed on each of the main windings. The unloader coil is connected in parallel with the main winding $M_1$, so that it is also subjected to 55 volts. The coil 26 is designed for such voltage and when so energized actuates the unloader to unloading position.

During the running period, the main windings $M_1$ and $M_2$ are connected directly in parallel with each other and directly across the line conductors $L_1$ and $L_2$, as shown in Fig. 5. It will be noted that both terminals of the coil 26 are now connected to the line conductor $L_1$, the lower terminal being permanently connected to the upper terminal of the main winding $M_2$ which is connected now to the line conductor $L_1$. Accordingly, the coil 26 is deenergized, whereby the unloader mechanism permits the associated cylinders to become loaded.

The control for the motor and the unloader is shown in Fig. 3. A suitable automatic control device, such as the thermostat 29, is preferably provided to control the normal starting and stopping of the motor. A manual switch 31 may also be provided for shutting down the apparatus. For controlling the starting and running connections, there is provided a relay 32 having an operating coil 33 and five sets of contacts 35 to 39. The contacts 35 and 36 are closed when the relay 32 is deenergized while the other contacts are open. There is also a time-delay switch, in the form of a thermal relay 41 having a heater 42 and make-contacts 43 which are open when the bi-metallic thermal element 44 is cold. The several contacts, windings and capacitors are connected as clearly shown in Fig. 3, so that detail description thereof is unnecessary. It should be noted, however, that the unloader coil 26 is permanently connected at one end to the line conductor $L_1$ and at the other end to the upper terminal of the main winding $M_2$. The windings $M_1$, $M_2$ and A, the rotor 28 and the unloader coil 26 are enclosed within the fluid-tight casing 11 as is diagrammatically indicated by the dot-and-dash circle in Fig. 3.

In operation, when the switches 29 and 31 are closed, power is supplied from the single phase line conductors $L_1$ and $L_2$ to the main windings $M_1$ and $M_2$ connected in series as shown in Fig. 3 through a circuit comprising the main winding $M_1$, the back contacts 36, the thermostat heater 42 and the main winding $M_2$. The auxiliary winding A is shunted across the main winding $M_1$ with the capacitor $C_1$ permanently connected in series with the auxiliary winding A and with the capacitor $C_2$ connected, through the relay contacts 35, in parallel with the capacitor $C_1$. The unloader coil 26 is also shunted across the main winding $M_1$ and is thereby energized. These constitute the starting connections and the motor thereupon starts with the compressor unloaded, achieving a speed somewhat below its synchronous speed in a very brief period of time, in the order of a second or less.

During the starting period, the heater 42, which carries the line current flowing during the continuance of the starting connections, heats the bi-metal member 44 to the point where it closes the contacts 43 in a period of time of the order of six or seven seconds, under various operating conditions. The closure of the contacts 43 completes a circuit from the line conductor $L_1$ through the contacts 43 and the relay coil 33 to the line conductor $L_2$. The coil 33 actuates the relay 32, opening the contacts 35 and 36 and closing the contacts 37, 38 and 39. The opening of the contacts 35 cuts the capacitor $C_2$ out of circuit. The opening of the contacts 36 opens the series connection between the main windings $M_1$ and $M_2$ and thereby deenergizes the heater 42. The contacts 37 connect the lower terminal of the main winding $M_1$ and the left-hand terminal of the auxiliary winding A to the line conductor $L_2$. The contacts 38 connect the upper terminal of the main winding $M_2$ directly to the line conductor $L_1$. Since the lower terminal of the unloader coil 26 is permanently connected to the upper terminal of the main winding $M_2$, it is also connected to the line conductor $L_1$. As both terminals of the coil 26 are now connected to the line conductors $L_1$, there is no potential imposed on the coil, and it is thereby deenergized.

It will be noted that the unloader coil 26 is shunted across the contacts 38. There is a potential drop of 55 volts across these contacts during starting, which is thereby imposed on the unloader coil. During the running period, the contacts 38 short circuit the unloader coil, so that there is no potential imposed thereon and it is thereby energized.

The contacts 39 complete a holding circuit for the coil 33, whereby the relay 32 maintains the control connections for running operation as long as current is continuously supplied. Upon any interruption in the flow of current, however, the coil 33 is deenergized permitting the relay 32 to move to starting position. Before the coil can again be energized, a period of time corresponding to the starting period must elapse during which the heater 42 again heats the bi-metallic thermal element 44 to close the contacts 43.

From the above description, it will be apparent that I have so connected the unloader coil 26 that it may be disposed within the casing 11 without the necessity of providing any additional lead-in connections. Also, since the coil 26 is not subjected to a gradually varying voltage but is subjected to either an adequate voltage for energizing the same or is completely deenergized, there is provided sufficient force for satisfactorily operating the unloader, that is, to either fully load or unload the compressor.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A motor-compressor unit comprising a fluid-translating device, a motor for driving the same, said motor comprising first and second windings, means for connecting said windings in series for starting and in parallel for running, and an unloader mechanism connected so that it is in parallel with one of said windings during the starting period and is thereby energized and so that it is short circuited and thereby deenergized during the running period.

2. A motor-compressor unit comprising a compressor, an unloader mechanism for unloading said compressor, electrically-operated means for actuating said unloader mechanism, a drive motor connected to said compressor and having first and second windings, line conductors for supplying electric current to said motor, switching means for connecting said windings selectively in series or in parallel across said line conductors and including contacts which are open and subjected to a potential difference during series connection and which are closed during parallel connection, said electrically-operated means being shunted across said contacts whereby it is energized during starting operation and is deenergized during running operation.

3. A motor-compressor unit comprising a compressor, an unloader mechanism for unloading said compressor, electrically-operated means for actuating said unloader mechanism, a drive motor connected to said compressor and having first and second windings, line conductors for supplying electric current to said motor, switching means for connecting said windings selectively in series or in parallel across said line conductors, one terminal of said electrically-operated means being connected to one line conductor and the other terminal being connected to an electrical conductor at a point where the potential is the same as in said one line conductor during running operation but is different during starting operation, whereby said electrically-operated means is energized during starting operation only.

4. A motor-compressor unit comprising a compressor, an unloader mechanism for unloading said compressor, electrically-operated means for actuating said unloader mechanism, a drive motor connected to said compressor and having first and second windings, line conductors for supplying electric current to said motor, one end of each of said windings being connected to one of said line conductors, means for connecting the other ends of said windings to each other or to the opposite line conductors, said electrically-operated means being connected to one line conductor and to the winding terminal which is connected to said line conductor only during running operation, whereby said electrically-operated means is energized during starting operation and is deenergized during running operation.

5. A motor-compressor unit comprising a compressor, an electrically-actuated unloader, a motor for driving said compressor and including first and second windings, line conductors for supplying electric current to said motor, said windings being connected, each at one end, to the respective line conductors, means for connecting the other ends of said windings selectively to each other to connect the same in series across said line conductors, or to connect said other ends to the respective opposite line conductors to connect said windings in parallel across said line conductors, said unloader mechanism being connected to one of said line conductors and also to the winding end which is connected to said line conductor in the parallel connections, whereby said unloader mechanism is energized when the windings are connected in series and deenergized when connected in parallel.

6. A motor-compressor unit comprising a compressor, an electrically-actuated unloader, a motor for driving said compressor and including first and second windings, each winding having first and second terminals, first and second line conductors for supplying electric current to said motor, the first terminals of said first and second windings being respectively connected to said first and second line conductors, means for selectively connecting the second terminals of said first and second windings, respectively, to said second and said first line conductors to connect said windings in parallel across said line conductors or connecting the same to each other to connect said windings in series across said line conductors, one terminal of said unloader mechanism being connected to said first conductor and the other terminal thereof being connected to the second terminal of said second winding, whereby said unloader mechanism is energized during series connection and deenergized during parallel connection.

7. A motor-compressor unit comprising a compressor, an unloader mechanism for unloading said compressor, electrically-operated means for actuating said unloader mechanism, a drive motor connected to said compressor, line conductors for supplying electric current to said motor, switching means for said motor providing starting and running connections and including contacts which are open and subjected to a potential difference during one connection and which are closed during another connection, said electrically-operated means being shunted across said contacts whereby said means is energized when said contacts are open and deenergized when said contacts are closed.

CLIFFORD S. CODY.